United States Patent [19]

Smith et al.

[11] 4,451,188
[45] May 29, 1984

[54] COIL CAR WITH SHIFTABLE TROUGH ASSEMBLIES

[75] Inventors: Ryan M. Smith, Woodstock; David A. Stoller, Sr., Dunwoody, both of Ga.

[73] Assignee: Portec, Inc., Oak Brook, Ill.

[21] Appl. No.: 329,207

[22] Filed: Dec. 9, 1981

[51] Int. Cl.³ .......................... B60P 7/12; B60P 7/14; B61D 3/16

[52] U.S. Cl. ........................................ 410/42; 410/47; 410/49

[58] Field of Search .................... 105/243, 377; 410/2, 410/31, 32, 36, 37, 41, 42, 47, 48, 49, 50, 96, 97, 98, 99, 117, 120

[56] References Cited

U.S. PATENT DOCUMENTS

| | | | |
|---|---|---|---|
| 2,494,404 | 1/1950 | Nixon | 410/42 |
| 2,991,734 | 7/1961 | Gabriel | 410/49 |
| 3,291,072 | 12/1966 | Cunningham | 410/49 |
| 3,376,062 | 4/1968 | Chosy et al. | 105/243 X |
| 3,465,692 | 9/1969 | Hyatt | 410/47 |
| 3,628,466 | 12/1971 | Lyons et al. | 410/49 |
| 3,658,195 | 4/1972 | Fantin | 410/42 |

FOREIGN PATENT DOCUMENTS

| | | | |
|---|---|---|---|
| 1605031 | 3/1970 | Fed. Rep. of Germany | 410/49 |
| 1584829 | 2/1981 | United Kingdom | 410/42 |

Primary Examiner—Robert B. Reeves
Assistant Examiner—Howard Beltran
Attorney, Agent, or Firm—Emory L. Groff, Jr.

[57] ABSTRACT

A railway car adapted to convey cylindrical objects such as coils includes a plurality of fixed trough members and sections of shiftable inclined trough assemblies disposed atop a support deck. By selectively laterally displacing the shiftable trough assemblies the car is alternately configured to provide single/triple or double troughs, or a combination thereof, in order to achieve maximum lading capacity in any one car regardless of the diameters of the coils. Positioning elements on each shiftable trough assembly alternately mate with a fixed trough member or separate positioning elements on the support deck to specifically define the various trough modes. A lock assembly is operable to engage a retainer element carried by each shiftable trough assembly when located in either mode.

15 Claims, 5 Drawing Figures

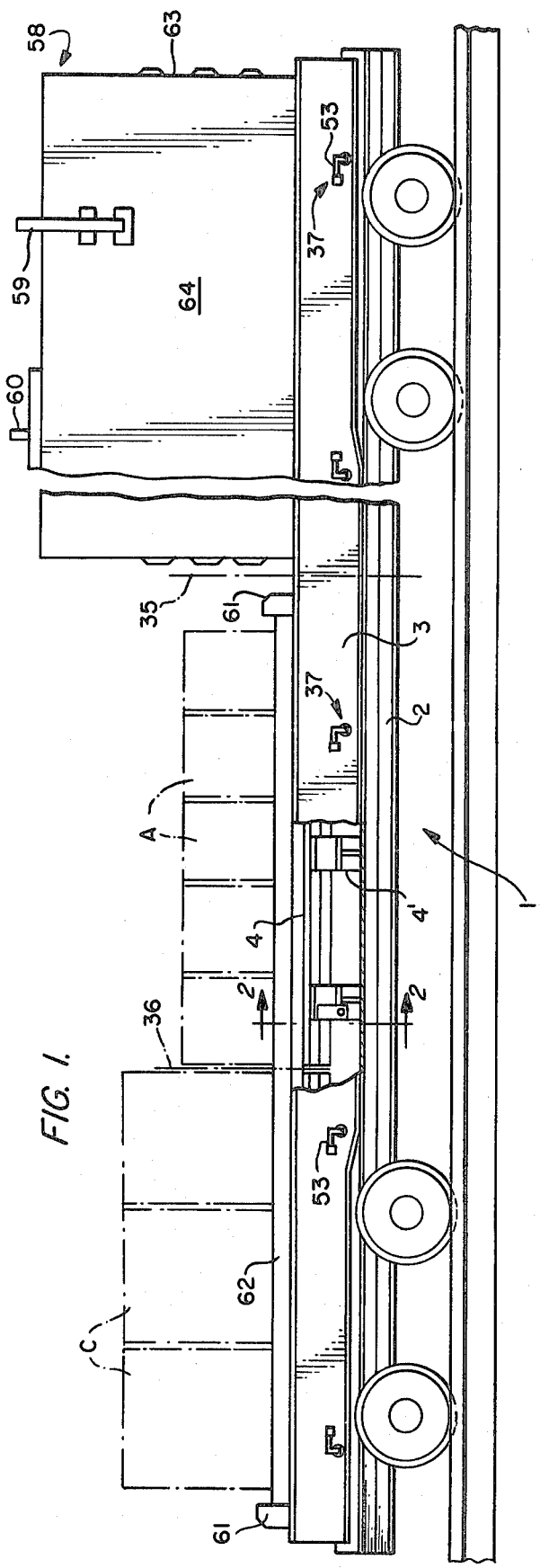
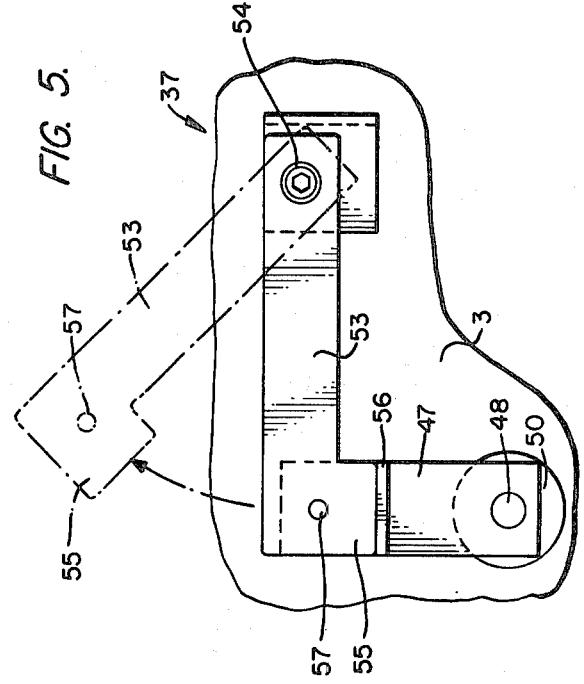
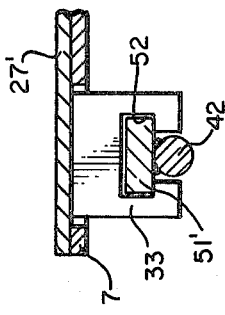

COIL CAR WITH SHIFTABLE TROUGH ASSEMBLIES

This invention relates generally to a railway car adapted to convey cylindrical objects such as coil steel and more particularly, to improvements allowing conversion of such a car from a single or triple trough arrangement to a double trough mode whereby maximum utilization may be made of the car capacity whether handling smaller or larger diameter coils or a combination thereof.

A conventional coil carrying railway car usually comprises a gondola or flat car provided with a single or a pair of laterally spaced longitudinally extending depressions or troughs adapted to receive and support a plurality of axially arranged coils. With either type of construction, the capacity of the car is seldom achieved. For example, in the case of a single trough car, if the load comprises a plurality of 30-inch diameter coils, the load will fall short of even reaching 50% capacity. A double trough car on the other hand, allows conveyance of twice as many smaller diameter coils as a single trough car but still falls short of reaching the capacity of such a car. Additionally, the shipment of large diameter coils, such as 96-inches, is precluded when operating with a double trough car since the outer periphery of these larger coils would extend substantially beyond the side limit of the car.

Thus many existing vehicles designed to convey cylindrical objects are less than desirable from two standpoints. They can not accommodate the full range of lading dimensions and do not allow for attainment of the vehicle capacity at least when handling certain dimensions.

The present invention provides an improved coil-carrying car which is readily convertible from a first mode providing either a single usable trough or triple troughs, to an alternate mode presenting double troughs. The advantages of such an arrangement are quite obvious since it permits maximum utilization of the capacity of any car so equipped. This selectivity is provided by means of fixed center trough members and fixed outer trough members which cooperate with a plurality of shiftable trough assemblies which are alternately positioned with respect to the plurality of fixed trough members to provide either the single/triple mode or the double trough mode. A plurality of sections of the shiftable trough assemblies are employed in an end-to-end disposition throughout the longitudinal extent of the car and in this manner adjacent pairs of these assemblies may be selectively positioned in either of the two alternate modes so that the entire length of the car is configured in either one of the modes or a combination of the two modes. In the latter case, it will follow that a different mixture of various diameter coils can thus be accommodated in any single car and in view of the novel construction to be described hereinafter, the maximum capacity of the car may be more closely approached regardless of the coil diameters being shipped.

An example of a coil carrying car adapted to be converted from a single to a double trough mode will be found in the patent to Cunningham, U.S. Pat. No. 3,291,072, which issued Dec. 13, 1966. Structure disclosed in this patent still would not utilize the maximum car capacity if the entire load comprises a plurality of small size coils inasmuch as the double trough mode will be understood to still result in the waste of a large area within the confines of the car.

Accordingly, one of the objects of the present invention is to provide an improved coil car including shiftable trough assemblies which may be located in alternate positions to present either a single/triple trough mode or a double trough mode.

Another object of the present invention is to provide an improved coil car having center and outer fixed trough members cooperating with intermediate shiftable trough assemblies which may be located in alternate positions to convert the car from a double trough mode to a single/triple trough mode.

A further object of the present invention is to provide an improved coil car wherein transported coils are disposed atop both a fixed trough member and a shiftable trough member with the shiftable trough member capable of being alternately positioned to define an alternate number of parallel troughs in the car.

Still another object of the present invention is to provide an improved coil car adapted to be converted to provide an alternate number of troughs and including shiftable trough assemblies having positioning means thereon selectively engageable with alternate fixed mating positioning means to define an alternate number of coil carrying troughs.

Another object of the present invention is to provide an improved coil car having trough assemblies laterally shiftable between alternate positions to define a variable number of troughs and having retainer means engageable by displaceable lock means when positioned in either of the selected alternate positions.

With these and other objects in view which will more readily appear as the nature of the invention is better understood, the invention consists in the novel construction, combination and arrangement of parts hereinafter more fully described, illustrated and claimed.

FIG. 1 is a side elevation of a coil car according to the present invention;

FIG. 4 is a cross-section taken along the line 4—4 of FIG. 3; and

FIG. 5 is an enlarged end elevation of the lock releasing mechanism of the lock assembly.

Similar reference characters designate corresponding parts throughout the several figures of the drawings.

Figure 2:
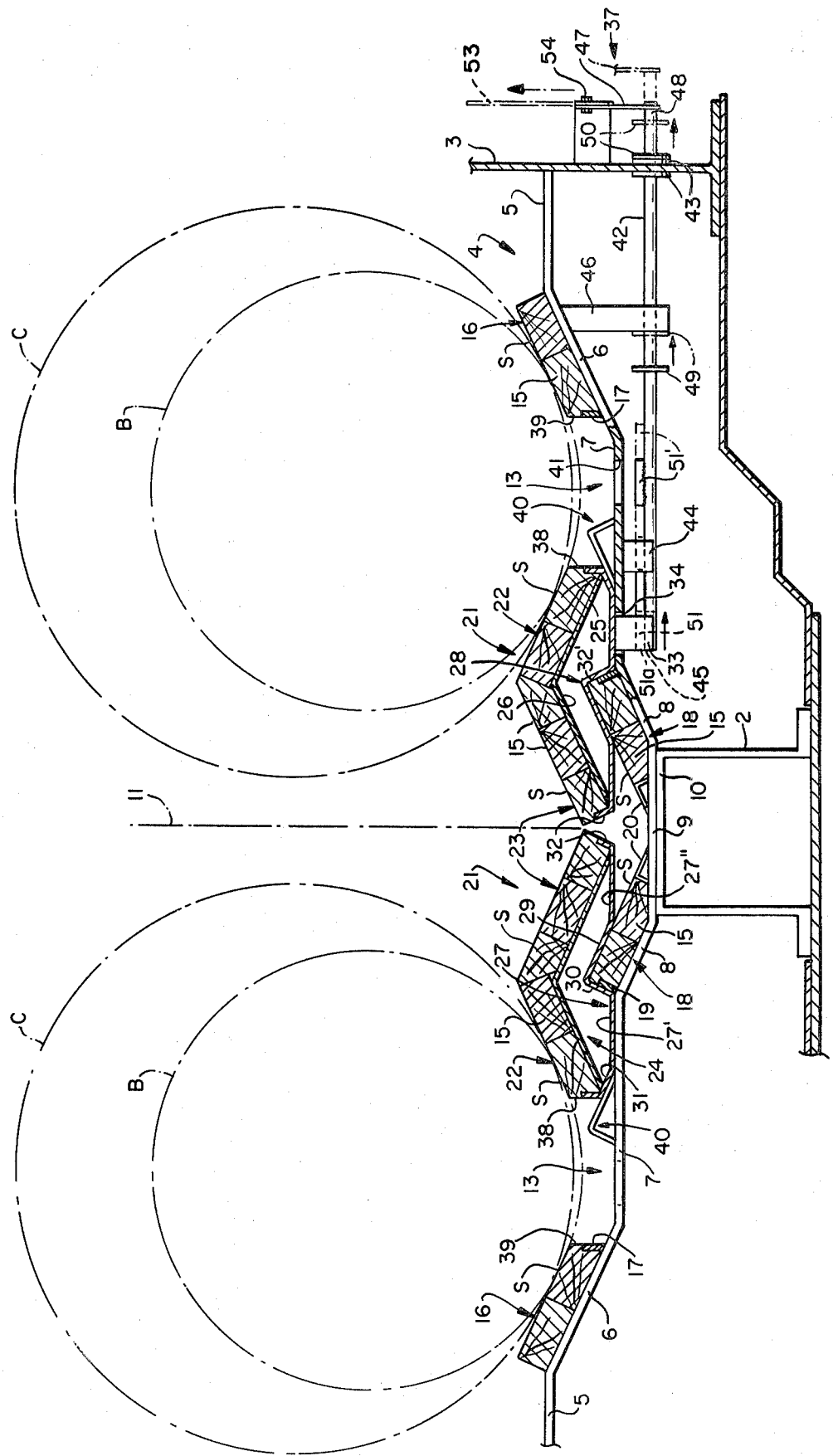
FIG. 2 is an enlarged transverse sectional view taken along the line 2—2 of FIG. 1.

Referring now to the drawings, particularly FIG. 1, the present invention will be seen to relate to a wheeled vehicle such as the coil car generally designated 1. Railway cars adapted for the transport of cylindrical objects or coils of material such as steel or other metal, and wherein the coils are intended to be axially arranged in an end-to-end relationship with their lower peripheries supported upon the car, are generally well known. Many such prior known cars comprise either one centrally disposed depression or trough thereon, or a fixed set of double or laterally spaced apart troughs extending the length of the car. By the present invention, a unique structure is provided whereby the lading area of the car may be converted to provide an alternate number of troughs with the apices of the outermost troughs variably spaced from the car centerline so as to accommodate, in the most efficient manner, the greatest amount of lading in any one car. The car 1 itself, may comprise either a gondola or a flat car. The drawings illustrate the latter case although quite obviously the same structure proposed by this invention may just as readily be utilized with a gondola car.

The car comprises the usual basic structure, namely a frame assembly including a center sill 2 and a pair of side sills 3—3 which may be joined to one another by the usual crossbearers and intermediate cross-ties (not shown).

The coil lading is adapted to be deposited within a series of troughs formed atop support means comprising a lading support deck 4 which extends the length of the car and spans the car interior between the two side sills 3—3. The deck 4 itself does not form the troughs but instead serves to support a plurality of fixed trough members and shiftable trough assemblies, the latter being alternately positionable relative the former to define troughs having their apices located various distances from the car centerline. The support deck 4 in turn is suitably supported by appropriate crossmembers 4' as shown in FIG. 1 and which have been omitted in FIGS. 2 and 3 for purposes of clarity.

Figure 3:
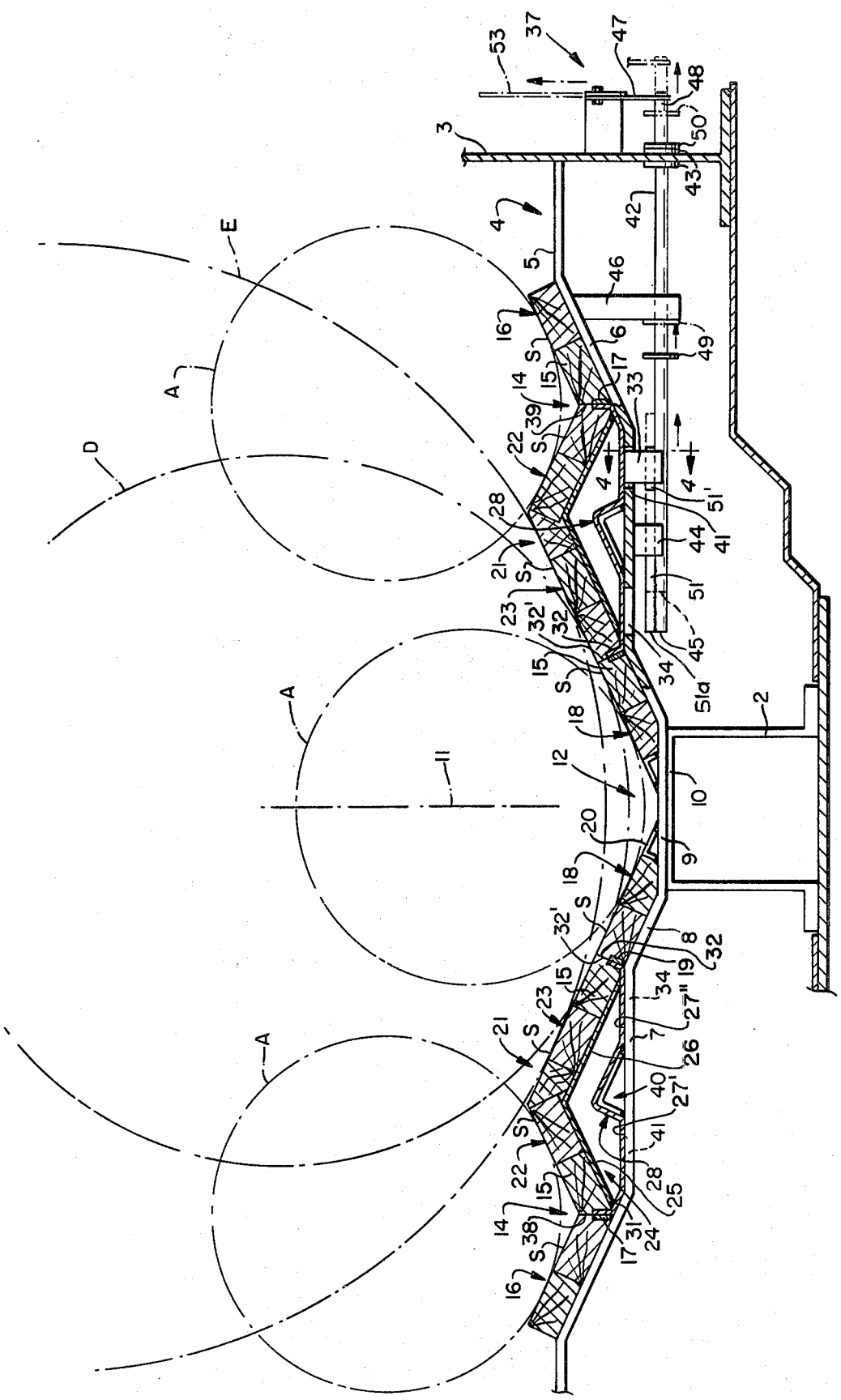
FIG. 3 is a view similar to FIG. 2 and illustrates an alternate positioning of the shiftable trough assemblies.

FIGS. 2 and 3 of the drawings, illustrate the alternate disposition of the shiftable components of the invention which permits the attainment of either a double trough mode or a single/triple trough mode, respectively. Examples of the various sizes of coils which may be accommodated by the alternate trough configuration is reflected by the outlines of coils A, B, C, D, and E. The components defining the alternate trough configuration may now be considered. The referenced lading support deck 4 includes an outer elevated portion 5 attached to the interior surface of each car side sill 3 and is joined to an outer inclined deck section 6 having its lowermost portion in turn joined to a horizontally disposed intermediate deck portion 7. Extending inwardly and downwardly from the inner portion of the intermediate deck portion 7 is an inner inclined deck section 8 having its innermost edge joined to a central dropped deck portion 9 and which overlies the top of the center sill 2. It will be understood that the various components forming the trough structure of the car and as provided between any one side sill 3 and the car centerline 11 is duplicated in a mirror image, between the centerline 11 and the other side sill 3. Thus certain details to be described hereinafter with respect to the right-hand portion of the structure shown in FIGS. 2 and 3 of the drawings are understood also to be included in the trough structure associated with the left-hand portion of these drawing figures.

The uppermost surfaces S defining all of the troughs 13 and the two outer troughs 14 will be seen to comprise planking formed of any suitable material such as a plurality of hardwood blocks 15. Such construction is well known in the art as it provides replaceable elements for engaging the coil peripheries with the least likelihood of damage thereto.

Mounted atop the outer inclined deck section 6 of the lading support deck 4 is a fixed outermost trough member 16 the position of which may be stabilized by use of a metal frame element 17 joined to the deck section 6, such as by welding. As will be described hereinafter and as shown in FIGS. 2 and 3, the two fixed outermost trough members 16 are employed when the car is configured to provided both the double trough or single/triple trough mode.

The lading support deck 4 includes additional stationary trough members comprising the pair of adjacently disposed central trough members 18—18 mounted atop the inner inclined deck sections 8 and overlying a portion of the center sill top 10. These trough members 18 are fixedly joined to the support deck 4 by outer frame elements 19 and inner frame elements 20 which in turn are welded or otherwise secured to the support deck 4. As shown in FIG. 3, these central trough members 18 define the central trough 12 when either the single or triple trough mode is selected and will perform another function when the double trough mode is utilized as shown in FIG. 2. This alternate function will be described hereinafter.

The alternate trough configurations are achieved by selectively locating a pair of shiftable trough assemblies, generally designated 21—21, each of which will be seen to comprise an inverted "V" configuration when viewed in transverse section. Each assembly includes an outermost dual trough member 22 inclined downwardly and outwardly and joined to an innermost center trough extension member 23 which is inclined downwardly and inwardly toward the car centerline 11. The two members 22 and 23 of each shiftable trough assembly 21 are retained in the illustrated inverted "V" configuration by use of an underlying frame 24.

The box-like frame 24 comprises a raised top plate including an outer inclined section 25 joined to an inner inclined section 26 and which are supported by the bottom plate 27. This bottom plate 27 of the frame 24 includes a female positioning member 28 comprising a recess formed by the two upwardly directed walls 29 and 30, the purpose of which will become apparent hereinbelow. The remainder of the bottom plate 27 is substantially horizontally disposed with the exception of the outermost portion which is formed as an upwardly inclined flange 31. The displacement of the trough assemblies 21—21 may be considered to depict first and second positions in FIGS. 2 and 3 respectively.

Conversion between the alternate configuration is achieved by the lateral shifting of the two trough assemblies 21—21 between the positions illustrated in FIGS. 2 and 3 of the drawings so as to define alternate troughs having apices disposed various distances from the car centerline 11. Each trough apex will be understood to comprise the intersection of the planes of the downwardly inclined surfaces S of any two adjacent trough members.

In the double trough mode shown in FIG. 2, the shiftable trough assemblies 21 are located with their inner edges 32—32 juxtaposed one another along the car centerline 11. The trough assemblies are positively positioned and aligned in a stable manner through of the female frame positioning member 28 which overlies a portion of the fixed central trough member 18. When thusly positioned, the wall 29 of the positioning member engages the upper surface S of the central trough member 18 while the wall 30 abuts the outer edge 32' of the same trough member. The outer section 27' of the trough assembly bottom plate is flushly disposed atop the intermediate deck portion 7 of the lading deck 4 and includes a trough assembly retainer 33 attached to its undersurface and which extends downwardly through a double trough mode retainer access 34 or hole formed through the intermediate deck portion 7 adjacent the inner inclined deck section 8.

At this point, it would be appropriate to indicate that the shiftable trough assemblies 21 do not necessarily extend the full length of the coil car 1. By employing a plurality of adjacent pairs of trough assemblies 21 throughout the length of the car, it will be appreciated that various trough configurations may be utilized in any one car such as reflected in FIG. 1. Two different coil lading arrangements are shown to the left of the transverse center line 35 of the car indicative that to the right of the transverse line 36 a single/triple trough mode is used and contains a maximum number of the smaller coils A while to the left of the transverse line 36, a double trough mode is being used containing the larger diameter coils C which could not be accommodated in the trough mode of FIG. 3. With this arrangement, the two shiftable trough assemblies 21 located between the transverse line 35 and 36 are disposed as in the position of FIG. 3 while two separate trough assemblies 21 are located to the left of the transverse line 36 and are positioned as shown in FIG. 2 of the drawings.

A lock assembly, generally designated 37, allows a track-side operator to securely retain and release the shiftable trough assemblies 21 when located in either of the two alternate positions. The details of the construction of this lock assembly will be described following a description of the trough assembly when positioned to provide the single/triple trough mode.

When it is desired to provide for the transport of the larger diameter coils D or E or on the other hand, to transport the maximum number of smaller coils A, then the trough configuration is changed from the double trough arrangement of FIG. 2 to the single/triple trough mode as depicted in FIG. 3. It is but a simple maneuver to relocate any two adjacent cooperating shiftable trough assemblies 21 in any area of the car 1 by suitable crane or hoisting means (not shown) to position these trough assemblies as shown in FIG. 3 wherein both the inner section 27" and outer section 27' of each trough assembly bottom plate overlies the intermediate deck portion 7 of the lading deck 4. When thusly disposed, the upper inclined flange 31 is flush with the outer inclined deck section 6 and the inner edge 32 of the trough assembly is juxtaposed the outer edge 32' of the central trough member 18 such that a smooth continuous upper surface S-S is provided by each central trough member 18 and the extension member 23 of the adjacent trough assembly 21. At the opposite edge of the trough assembly 21, its outer edge 38 will be seen to abut the inner edge 39 of the fixed outermost trough member 16 and provides the bottom apex of the outer trough 14. To additionally and more positively locate and retain the shiftable assemblies in this alternate position, fixed male positioning members 40 are attached to each intermediate deck portion 7 and project upwardly therefrom to mate within the positioning members 28 formed in the trough assembly bottom plate 27. When in this configuration, the aforementioned trough assembly retainer 33 is disposed through an alternate retainer access 41 comprising a hole formed through the intermediate deck portion 7 adjacent the upper inclined deck section 6.

The number of lock assemblies 37 associated with each coil car 1 will, of course, depend upon the number of sections of trough assemblies 21 provided for any one car. For example, in the case of the car shown in FIG. 1, a typical installation may comprise four series of adjacent trough assemblies 21 throughout the length of the car in which case it is proposed that each individual trough assembly 21 would be provided with two lock assemblies 37 controlled from the nearest or adjacent side sill 3. Therefore, each trough assembly will be understood to be provided with two downwardly extending retainers 33 spaced longitudinally of the respective trough assembly. As pointed out earlier, the structure depicted to the right of the car centerline 11 in FIGS. 2 and 3 is duplicated to the left of this centerline. Thus it will follow that the illustrated lock assemblies 37 are contained on both sides of the car.

The construction and operation of the illustrated lock assemblies may now be considered. Each assembly includes a lock shaft 42 journaled for axial displacement through the side sill 3 such as by use of the mounting blocks 43. An inner end lock shaft support 44 cooperates with the lock shaft adjacent its inner end 45 while additional medial support is provided through means of an intermediate support 46. The lock shaft 42 is adapted to be axially displaced between two alternate positions upon manipulation of an actuating handle 47 fixedly attached to its outer end 48. The two limits of the axial displacement of the lock shaft 42 are defined by an unlock collar 49 adapted to abut the intermediate support 46 and restrict the outward withdrawal of the lock shaft and by a lock collar 50 affixed to the outer end 48 of the shaft and adapted to abut the mounting blocks 43 to restrict the inward displacement of the lock shafts.

Associated with the upper surface of the lock shaft 42 in the area beneath the intermediate deck portion 7 are a pair of alignment and lock bars 51—51' suitable affixed to the lock shaft such as by welding as shown in FIG. 4 of the drawings. The two axially aligned bars 51—51' are located such that when the lock shaft 42 is in the full line locked position of FIGS. 2 and 3, the bars 51 and 51' will both be disposed in a vertical plane immediately beneath the two retainer access holes 34 and 41 respectively. In this manner, regardless of which trough mode is being employed, it will be seen that the trough assembly retainers 33 will be engaged by the respective bar 51 and 51' and therefore precluded from accidental or unwarranted removal from its installed position. This locking action is insured due to the engagement between the lock bars 51—51' and the cooperating guideway 52 formed in the retainer 33. FIG. 4 of the drawings illustrates the alignment and lock bar 51' comprising a rectangular member and accordingly the guideway 52 is configured to provide a mating profile allowing of relative longitudinal movement of the lock assembly but precluding rotary movement or vertical removal of the retainer 33 as long as the lock bar is disposed within the guideway 52.

When it is desired to remove or relocate an installed shiftable trough assembly 21, an operator grasps the actuating handle 47 and axially displaces the lock shaft 42 to the broken line position of FIGS. 2 and 3 and this action axially displaces the two lock bars 51—51'. In the case of the trough configuration of FIG. 2, this displacement removes the trailing end 51a of the bar 51 from the retainer 33 and entirely away from the vertical plane extending through the retainer access 34. In the alternate configuration of FIG. 3, this same displacement of the lock shaft 42 axially shifts the alignment bar 51' away from its respective cooperating guideway 52 and likewise away from the vertical plane passing through the retainer access 41.

To prevent rotary displacement of the lock shaft when in the retracted position and also to insure continued support of the inner end thereof when the lock assembly is retracted to the unlocked position, the lock bar 51 will be understood to also perform as an alignment bar since it is at all times engaged within the inner end lock shaft support 44 which latter support contains an internal configuration similar to that of the retainer 33 as shown in FIG. 4.

Structure must be provided to prevent accidental or unwarranted operation of the lock shaft 42 such as by vandalism or as a result of the normal vibrations during operation of the car over track. As shown most clearly in FIG. 5 of the drawings, a latch hook 53 is pivotally attached as at 54 to a latch bracket affixed to the outer surface of the side sill 3. The outer end 55 of the latch hook is adapted to be pivoted into an overlying relationship with the actuating handle 47 when the lock assembly 37 is in the locked or inwardly directed position and when thusly disposed, as shown in the full lines of FIGS. 2, 3 and 5, the latch hook outer end 55 abuts a shoulder or stop 56 on the handle. Since the actuating handle 47 is fixed against any rotatable or arcuate displacement, it follows that as long as the outer end 55 of the latch hook 53 overlies the actuating handle 47, the lock assembly cannot be manipulated. Mating holes 57 in the latch hook and actuating handle provide for the installation of a padlock or other securing device.

The coil car 1 may be provided with appropriate guide and retention means for enabling the use of removable covers or hoods 58 as shown in FIG. 1 of the drawings. These covers are well known in the art and provide security against both the elements and vandalism. Suitable stacking brackets 59 and lift arms 60 enable the installation, removal and storage of the removable covers 58 while the car 1 is provided with a suitable number of corner posts 61 and edge rails 62 which cooperate with the ends 63 and sides 64 of the covers 58 to prevent shifting of same when installed and to enhance the weather-tight engagement between the cover components and the coil car components.

We claim:

1. A vehicle for carrying cylindrical objects including, spaced apart longitudinal side sills defining a lading area therebetween, support means intermediate said side sills, a plurality of laterally spaced apart fixed trough members attached to said support means, at least a pair of removable shiftable trough assemblies selectively positionable above said support means at various lateral distances from the centerline of the vehicle, each said shiftable trough assembly defining an inverted "V" configuration, each said shiftable trough assembly when disposed at a first lateral position from the vehicle centerline forming with one of said fixed trough members a trough having its apex spaced from the vehicle centerline at a first distance, and each said shiftable trough assembly displaceable to a second lateral position relative the vehicle centerline to form with the respective same one of said fixed through members a trough having its apex spaced from the vehicle centerline at a second distance.

2. A vehicle for carrying cylindrical objects according to claim 1 wherein, said fixed trough members include an outermost trough member adjacent each said side sill and having an uppermost surface inclined inwardly and downwardly toward the vehicle centerline, and each said shiftable trough assembly having a dual trough member provided with an uppermost surface inclined outwardly and downwardly toward one said side sill, and adjacent ones of said outermost trough member and dual trough member uppermost surfaces defining troughs having apices variably spaced from the vehicle centerline as each said shiftable trough assembly is displaced into said first and second positions.

3. A vehicle for carrying cylindrical objects according to claim 1 including, a plurality of laterally adjacent pairs of said shiftable trough assemblies disposed along the length of said vehicle with selected adjacent pairs positioned different distances from the vehicle centerline to provide variably spaced trough apices at different points throughout the vehicle length.

4. A vehicle for carrying cylindrical objects according to claim 1 including, lock means releasably securing said shiftable trough assemblies in said first and second positions.

5. A vehicle for carrying cylindrical objects according to claim 4 wherein, said lock means includes a displaceable lock shaft beneath said support means, a retainer depending from each said shiftable trough assembly, and a lock bar on said lock shaft engageable with said retainer when said shiftable trough assembly is disposed in either alternate position.

6. A vehicle for carrying cylindrical objects according to claim 5 wherein, said support means includes a lading deck, said deck provided with a pair of holes for each said retainer, said lock shaft extending beneath said deck holes, and actuating means exteriorly of said vehicle to axially displace said shaft and lock bar.

7. A vehicle for carrying cylindrical objects according to claim 1 wherein, said fixed trough members include a pair of downwardly and inwardly inclined central trough members disposed on opposite sides of the vehicle centerline to define a center trough, fixed outermost trough members disposed adjacent said side sills each having an uppermost surface inclined inwardly and downwardly toward the vehicle centerline, said shiftable trough assemblies each having an inner edge and outer edge, and each said shiftable trough assembly when displaced into said second position having said inner edge juxtaposed one said central trough member and said outer edge juxtaposed one said fixed outermost trough member with the latter juxtaposition defining an outer trough adjacent one said side sill.

8. A vehicle for carrying cylindrical objects according to claim 7 wherein, said shiftable trough assemblies each include a trough extension member having said inner edge and when said inner edge is juxtaposed one said central trough member said extension member and central trough member are disposed in a common inclined plane.

9. A vehicle for carrying cylindrical objects according to claim 1 wherein, said fixed trough members include a pair of downwardly and inwardly inclined central trough members oppositely disposed adjacent the vehicle centerline, fixed outermost trough members disposed adjacent said side sills each having an uppermost surface inclined inwardly and downwardly toward the vehicle centerline, said shiftable trough assemblies each having an inner edge and outer edge, and two laterally adjacent said shiftable trough assemblies when displaced into said first position having said inner edges thereof juxtaposed substantially at the vehicle centerline with each said outer edge substantially inwardly spaced from one said outermost trough member with the latter spacing defining an intermediate trough to each side of said center trough.

10. A vehicle for carrying cylindrical objects according to claim 9 wherein, each said shiftable trough assembly includes bottom positioning means engageable with one said central trough member when said trough assembly disposed in said first position.

11. A vehicle for carrying cylindrical objects according to claim 9 wherein, the apices of said intermediate troughs are disposed substantially one-half the distance between the vehicle centerline and each said side sill.

12. A vehicle for carrying cylindrical objects according to claim 1 wherein, said fixed trough members include a pair of laterally spaced apart members on each side of the vehicle centerline, said shiftable trough assemblies each comprising a pair of downwardly inclined members mounted upon a frame assembly shiftable from one said position between said laterally spaced apart members to another said position overlying one said fixed trough member whereby the distance of the trough apices from the vehicle centerline is altered from one said position to the other.

13. A vehicle for carrying cylindrical objects according to claim 12 including, bottom positioning means on each said shiftable trough assembly, and fixed positioning means on said support means engageable with said bottom positioning means when each said trough assembly is disposed in either said position.

14. A vehicle for carrying cylindrical objects according to claim 1 wherein, said shiftable trough assemblies when located in one said position define triple troughs comprising a center trough and two outer troughs and said trough assemblies when located in another said position define dual troughs comprising a trough on each side of the vehicle centerline.

15. A vehicle for carrying cylindrical objects according to claim 14 wherein, said two outer troughs formed with said shiftable trough assemblies disposed in said second position define trough apices located closer to said side sills than the vehicle centerline and said two dual troughs formed with said shiftable trough assemblies disposed in said first position define trough apices located substantially one-half the distance between the vehicle centerline and each said side sill.

* * * * *